US009892600B2

(12) United States Patent
Hodges

(10) Patent No.: US 9,892,600 B2
(45) Date of Patent: Feb. 13, 2018

(54) ATM SKIMMER DETECTION BASED UPON INCIDENTAL RF EMISSIONS

(71) Applicant: Capital One Financial Corporation, McLean, VA (US)

(72) Inventor: William A. Hodges, Mechanicsville, VA (US)

(73) Assignee: CAPITAL ONE FINANCIAL CORPORATION, McLean, VA (US)

( * ) Notice: Subject to any disclaimer, the term of this patent is extended or adjusted under 35 U.S.C. 154(b) by 0 days.

(21) Appl. No.: 14/606,423

(22) Filed: Jan. 27, 2015

(65) Prior Publication Data

US 2015/0213428 A1 Jul. 30, 2015

Related U.S. Application Data

(60) Provisional application No. 61/932,311, filed on Jan. 28, 2014.

(51) Int. Cl.

*G06F 17/00* (2006.01)
*G07F 19/00* (2006.01)
*H04K 3/00* (2006.01)

(52) U.S. Cl.

CPC ......... *G07F 19/2055* (2013.01); *H04K 3/822* (2013.01); *H04K 2203/20* (2013.01)

(58) Field of Classification Search

CPC ............ G06K 7/10267; G06K 7/10079; G07F 19/2055

See application file for complete search history.

(56) References Cited

U.S. PATENT DOCUMENTS 8,418,917 B1 4/2013 Lewis et al.
8,833,669 B1 * 9/2014 Chin .................. G06K 7/0008 235/492

(Continued)

OTHER PUBLICATIONS

International Search Report and Written Opinion of the International Searching Authority in International Application No. PCT/US 15/13052, dated Apr. 17, 2015, 12 pages.

(Continued)

*Primary Examiner* — Talia Crawley

(74) *Attorney, Agent, or Firm* — Finnegan, Henderson, Farabow, Garrett & Dunner LLP

(57) ABSTRACT

The disclosed embodiments include methods and systems for detecting ATM skimmers based upon radio frequency (RF) signal. In one aspect, the disclosed embodiments include a system for detecting ATM skimmers including a memory storing instructions and one or more processors that execute the instructions to perform one or more operations for detecting ATM skimmers. The operations may include, for example, receiving radio frequency (RF) signal data corresponding to one or more RF signals detected by an antenna located within communication range of the ATM. The operations may also include determining one or more unidentified RF signals of the detected ATM RF signals that differ from one or more baseline RF signals. The operations may also include determining whether the one or more unidentified RF signals are present for a predetermined period of time, and determining whether a skimmer is present at the ATM based on a determination that the one or more unidentified RF signals are present for the predetermined period of time.

20 Claims, 4 Drawing Sheets

(56) References Cited

U.S. PATENT DOCUMENTS

| | | | | |
|---|---|---|---|---|
| 2005/0201450 | A1* | 9/2005 | Volpi | G06K 7/0008 375/150 |
| 2006/0169764 | A1* | 8/2006 | Ross | G07F 19/20 235/375 |
| 2007/0057070 | A1* | 3/2007 | Scarafile | G06K 7/084 235/475 |
| 2007/0063838 | A1 | 3/2007 | Yuzik | |
| 2008/0191860 | A1 | 8/2008 | Flook et al. | |
| 2011/0164811 | A1 | 7/2011 | Ishiyama | |
| 2013/0106576 | A1* | 5/2013 | Hinman | G06K 7/10267 340/10.1 |
| 2013/0106577 | A1* | 5/2013 | Hinman | G06K 7/10267 340/10.1 |
| 2013/0342317 | A1* | 12/2013 | Rimai | G06K 7/10069 340/10.1 |
| 2013/0342323 | A1* | 12/2013 | Hinman | G06K 7/10079 340/10.1 |
| 2015/0091547 | A1* | 4/2015 | Vasilev | G07F 19/2055 324/76.45 |

OTHER PUBLICATIONS

"Detecting Skimmers and other ATM traps," [online], May 2013 [retrieved Mar. 29, 2015]. Retrieved from the Internet: http://security.stackexchange.com/questions/36135/detecting-skimmers-and-other-atm-traps entire document, especially p. 1-3.

Office Action dated Jul. 10, 2017 in U.S. Appl. No. 14/606,342 to William A. Hodges entitled "Detection of Unauthorized Devices on ATMs" filed on Jan. 27, 2015.

* cited by examiner

ATM SKIMMER DETECTION BASED UPON INCIDENTAL RF EMISSIONS

RELATED APPLICATIONS

This application claims the benefit of U.S. Provisional Patent Application No. 61/932,311, entitled "ATM SKIMMER DETECTION BASED UPON INCIDENTAL RF EMISSIONS," filed on Jan. 28, 2014, the disclosure of which is hereby incorporated herein in its entirety.

TECHNICAL FIELD

The present disclosure relates generally to methods and systems for detecting unwanted electronic devices and, more particularly, to methods and systems for detecting automated teller machine ("ATM") skimmers.

BACKGROUND

An ATM is an electronic device that allows banking customers to carry out financial transactions without the need for a human teller. For example, customers may use an ATM to access their bank accounts, deposit, withdraw, or transfer funds, check account balances, or dispense items of value. Generally, to use an ATM, the customer may insert a banking card containing magnetic stripe information into the ATM's card reader, and authenticate the card by entering a personal identification number (PIN). After the card has been read and authenticated, the customer can carry out various financial transactions.

While ATMs are convenient, their use can also be risky. Thieves have been known to attach devices known as "skimmers" on or adjacent to the ATMs to capture the card information and PINs entered by the customer. These skimmers can remain on the ATM for an extended period of time prior to detection, and are sometimes constructed to match the visual appearance of the ATM's card reader. Thus, the customer is unable to determine whether the device is a skimmer or part of the ATM itself.

To combat these skimmers, bank employees often conduct periodic visual reviews of the ATM's appearance. However, these visual reviews are error prone (sometimes the skimmer is not found), labor intensive, time consuming, and expensive. Accordingly, a need exists to detect these skimmer devices quickly and inexpensively and thus mitigate the risk of the compromise of a customer's card data.

BRIEF SUMMARY

The disclosed embodiments include methods, systems, and non-transitory computer-readable storage media for detecting ATM skimmers based upon radio frequency (RF) signals emitted from the ATM. In one aspect, the disclosed embodiments include a system for detecting ATM skimmers including a memory storing instructions and one or more processors that execute the instructions to perform one or more operations for detecting ATM skimmers. The operations may include, for example, receiving radio frequency (RF) signal data corresponding to one or more detected RF signals emitted by an ATM and/or other electronic device and detected by an antenna located within communication range of the ATM. The operations may also include determining one or more unidentified RF signals of the detected ATM RF signals that differ from one or more baseline RF signals. The operations may also include determining whether the one or more unidentified RF signals are present for a predetermined period of time, and determining whether a skimmer is present at the ATM based on a determination that the one or more unidentified RF signals are present for the predetermined period of time.

The disclosed embodiments may also include a computer implemented method for detecting ATM skimmers. In one aspect, the method may include receiving radio frequency (RF) signal data corresponding to one or more detected RF signals emitted by an ATM and detected by an antenna located within communication range of the ATM. The method may also include determining one or more unidentified RF signals of the detected ATM RF signals that differ from one or more baseline RF signals. The method may also include determining whether the one or more unidentified RF signals are present for a predetermined period of time, and determining whether a skimmer is present at the ATM based on a determination that the one or more unidentified RF signals are present for the predetermined period of time.

The disclosed embodiments may also include a non-transitory computer-readable storage medium. In one aspect, the non-transitory computer-readable storage medium may be encoded with instructions which, when executed on a processor, perform a method. The method may include receiving radio frequency (RF) signal data corresponding to one or more detected RF signals emitted by an ATM and detected by an antenna located within communication range of the ATM. The method may also include determining one or more unidentified RF signals of the detected ATM RF signals that differ from one or more baseline RF signals. The method may also include determining whether the one or more unidentified RF signals are present for a predetermined period of time, and determining whether a skimmer is present at the ATM based on a determination that the one or more unidentified RF signals are present for the predetermined period of time.

It is to be understood that both the foregoing general description and the following detailed description are exemplary and explanatory only and are not restrictive of the disclosed embodiments, as claimed. Further features and/or variations may be provided in addition to those set forth herein. For example, disclosed embodiments may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute part of this specification, illustrate various embodiments and together with the description, serve to explain one or more aspects of the disclosed embodiments. In the drawings.

DETAILED DESCRIPTION

Figure 1:
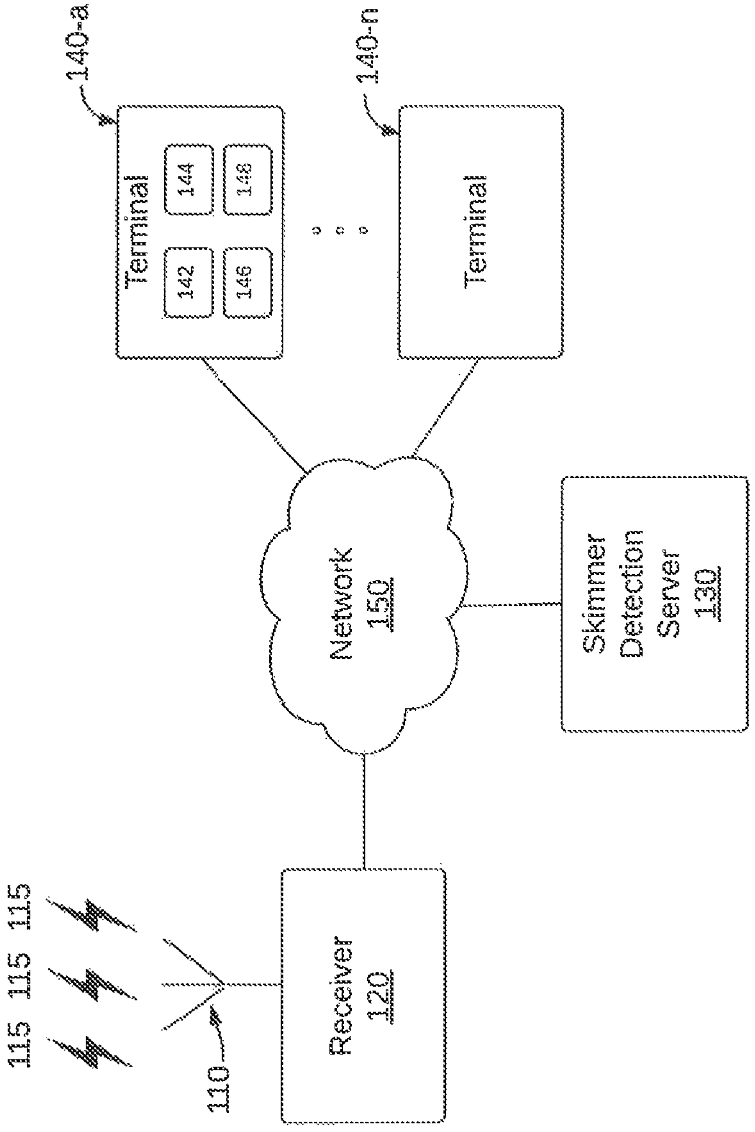
FIG. 1 is a block diagram of an exemplary skimmer detection system consistent with disclosed embodiments.

The following detailed description refers to the accompanying drawings. Wherever possible, the same reference numbers are used in the drawings and the following description to refer to the same or similar parts. While several exemplary embodiments and features of the disclosed embodiments are described herein, modifications, adaptations, and other implementations are possible, without departing from the spirit and scope of the disclosed embodiments. Accordingly, the following detailed description does not limit the disclosed embodiments. Instead, the proper scope of the disclosed embodiments may be defined by the appended claims.

Almost all electronic devices emit radio frequency ("RF") signals incidental to their operation. Thus, the disclosed embodiments may use these incidental RF emissions to detect skimmer devices present on ATMs. To this end, an exemplary system may be configured to determine one or more baseline RF signals associated with an ATM, detect RF signals near the ATM, and/or determine any differences between the baseline RF signals and the detected RF signals. The system may also determine whether a skimmer is present based on the detected RF signals. For example, the system may compare the detected RF signals to data contained in a known skimmer emissions database to determine whether the detected RF signals match any known ATM skimmers. As another example, the system may also determine that a skimmer is present based on the number and type of detected RF emissions in various frequency ranges and/or the period of time that the particular RF emissions are detected. As yet another example, the system may also detect increases in ambient RF noise levels that are not clearly confined to specific frequencies. The system may also include multiple receiving antennas to enable a directional read of the source of the RF emissions to reduce false positives.

FIG. 1 is a block diagram of an exemplary skimmer detection system 100 consistent with disclosed embodiments. System 100 may be implemented in a number of different configurations without departing from the scope of the disclosed embodiments. In the embodiment shown in FIG. 1, system 100 may include an antenna 110 adapted to detect one or more RF signals 115 and a receiver 120 that receives the RF signals detected by antenna 110 and converts those signals to digital data. System 100 may also include a skimmer detection server 130 that may be configured to demodulate the digital data and analyze the demodulated data to detect whether a skimmer is present on or near an ATM. System 100 may also include one or more client terminals 140-*a* to 140-*n*, and a network 150 for interconnecting one or more of antenna 110, receiver 120, server 130, and client terminals 140-*a* to 140-*n*. While FIG. 1 shows only one antenna 110, receiver 120, and server 130, system 100 may include any number of antennas 110, receivers 120, and servers 130.

Antenna 110 may be any type of known antenna capable of detecting RF signals. For example, antenna 110 may be any type of commercially available wideband antenna or tunable antenna.

Receiver 120 may be any type of receiver that can receive one or more frequencies of RF signals, and may be configured in hardware, software and/or some combination of hardware and software. Receiver 120 may also convert the received RF signals into digital data, and send the digital data to one or more devices, such as skimmer detection server 130. Receiver 120 may also be associated with a particular ATM (not pictured) and may store identification information related to the ATM (e.g., ATM location, ATM type, etc.) in a memory. Receiver 120 may also transmit the identification information to server 130 using any known transmission method such as for example, using one or more data packets. In some configurations, receiver 120 may be a software defined radio ("SDR") capable of simultaneously listening for a plurality of differently modulated signals at once. Exemplary commercially available SDRs may include RTL-SDR, Zeus ZS-1, and Flex Radio.

Skimmer detection server 130 may be a computing system that performs various functions consistent with the disclosed embodiments. In some embodiments, server 130 may be configured to process information received from receiver 120. For example, server 130 may demodulate the digital data received from receiver 120 and perform analyses on the digital data to determine whether a skimmer is present. As another example, server 130 may capture one or more data packets transmitted by receiver 120 and decode the packets' raw data, such as the identification information related to the ATM. Server 130 may also store the decoded raw data in memory 233. Server 130 may also generate and send one or more alerts to one or more of client terminals 140-*a* through 140-*n*. Certain functions that may be performed by server 130 are described in greater detail below with respect to, for example, FIGS. 2-4.

Each client terminal 140 may be a computing system operated by a user. In one example, client terminal 140 may be a computing device configured to perform one or more operations consistent with certain disclosed embodiments. For example, terminal 140 may be configured to generate and/or display alerts indicating that a skimmer has been detected on one or more ATMs. Terminal 140 may be a desktop computer, a laptop, a server, a mobile device (e.g., tablet, smart phone, etc.), and any other type of computing device. Client terminal 140 may include one or more processors configured to execute software instructions stored in memory. The disclosed embodiments are not limited to any particular configuration of client terminal 140. For instance, as shown in FIG. 1 (for simplicity, in terminal 140-*a* only), client terminal 140 may include, for example, a processor 142, a memory 144, a display device 146, and an interface device 148. Processor 142 may be one or more processor devices, such as a microprocessor, or other similar processor device(s) that executes program instructions to perform various functions. Memory 144 may be one or more storage devices that maintain data (e.g., instructions, software applications, etc.) used and/or executed by processor 142. Display device 146 may be any known type of display device that presents information to a user operating terminal 140. Interface device 148 may be one or more known interface device modules that facilitate the exchange of data between the internal components of client terminal 140 and external components, such as server 130. In one embodiment, interface device 148 may include a network interface device that allows client terminal 140 to receive and send data to and from network 150.

Network 150 may be any type of network that facilitates communication between remote components, such as server 130 and terminals 140-*a* to 140-*n*. For example, network 150 may be a local area network (LAN), a wide area network (WAN), a virtual private network, a dedicated intranet, the Internet, and/or a wireless network.

The arrangement illustrated in FIG. 1 is exemplary and system 100 may be implemented in a number of different configurations without departing from the scope of the disclosed embodiments. For example, components 120 and 130 may be connected through other communication link(s), as opposed to being connected via network 150. Further additional components may be included in system 100, such as a connection to other skimmer detection systems that may provide information to server 130. Moreover, one or more of components 110, 120, 130, 140, and/or 150 may be included in a single device or various combinations of devices.

Figure 2:
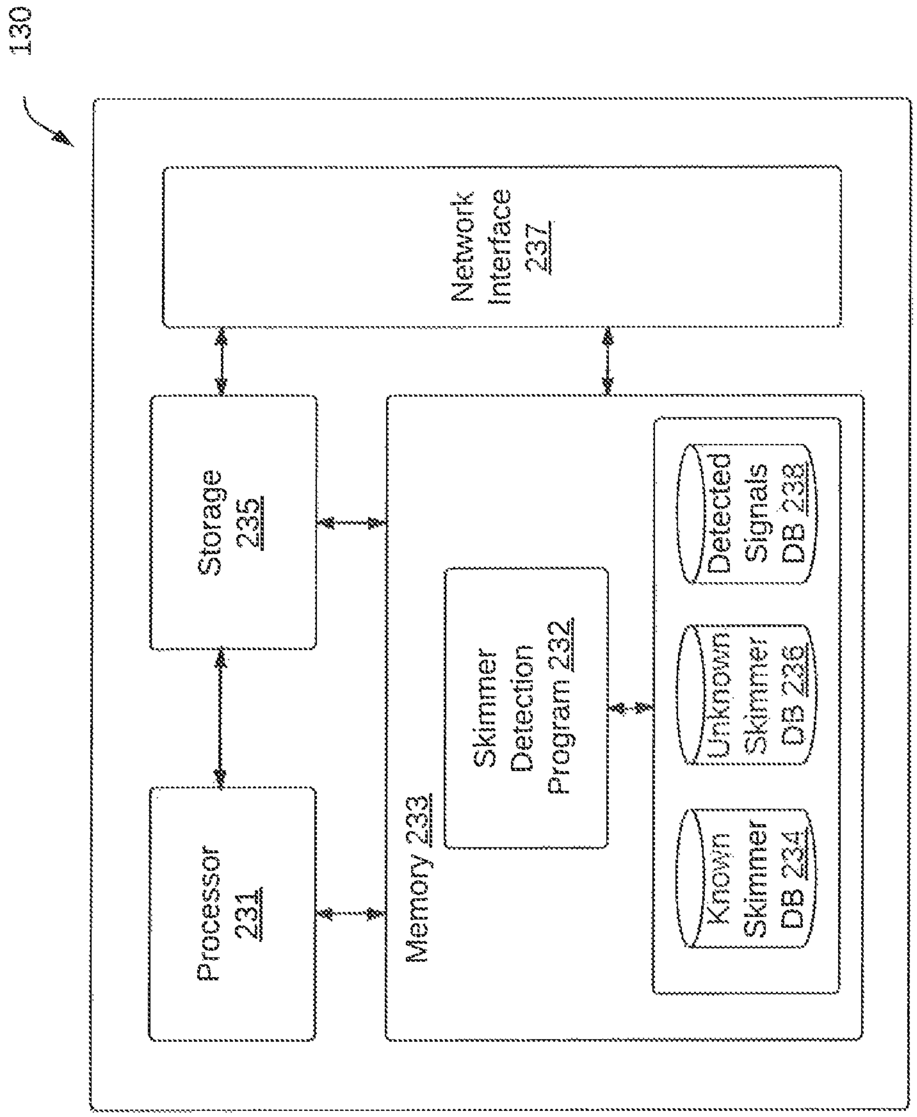
FIG. 2 is a block diagram of an exemplary skimmer detection server consistent with disclosed embodiments.

FIG. 2 is a block diagram of the exemplary skimmer detection server 130 consistent with disclosed embodiments. Server 130 may be implemented in various ways. For example, server 130 may be a special purpose computer, a server, a mainframe computer, a computing device executing software instructions that receive and processes information and provide responses, or any combination of those components. In one example, as shown in FIG. 2, server 130 may include a processor 231 a memory 233, storage 235, a network interface 237, and input/output (I/O) devices (not shown).

Processor 231 may include one or more processors, such as known processing devices, microprocessors, etc. configured to execute instructions to perform operations. Memory 233 may include one or more storage devices configured to store information used and/or executed by processor 231 to perform one or more operations related to disclosed embodiments. Storage 235 may include volatile or non-volatile, magnetic, semiconductor, tape, optical, removable, nonremovable, or any other type of storage device or tangible computer-readable medium.

In some embodiments, memory 233 may include software instructions that when executed by processor 231, perform operations consistent with disclosed embodiments. For example, memory 233 may include software instructions that when executed perform one or more skimmer detection processes consistent with disclosed embodiments. In one example, memory 233 may include skimmer detection program 232. In one embodiment, program 232 may be loaded from storage 235 or another source component that, when executed by skimmer detection server 130, perform various procedures, operations, and/or processes consistent with disclosed embodiments. For example, memory 233 may include a skimmer detection program 232 that performs operations that may determine one or more differences between one or more baseline RF signals and one or more detected RF signals and, based on the detected differences, determine whether a skimmer is present on or near an ATM. Memory 233 may also include other programs that perform other functions and processes, such as programs that provide communication support, Internet access, database access, and the like. Memory 233 may also include one or more interconnected information storage databases, such as, for example, known skimmer database 234, unknown skimmer database 236, and detected signals database 238. The information storage databases can by populated by any known methods. For example, server 130 may populate known skimmer database 234 by receiving one or more database entries from another component, a wireless network operator, or a user of server 130 and/or terminal 140, and storing the database entries into memory 233. The database entries can contain a plurality of fields, one or more of which may include information related to known skimmer devices, such as, for example, skimmer device names, the frequency or frequencies of RF signals emitted by the skimmer device, the amplitude(s) of the RF signals emitted by the skimmer device, one or more images of the skimmer device, information related to disabling the particular skimmer device, and the like. While in the embodiment shown in FIG. 2 the information storage databases are interconnected, each information storage database need not be interconnected. Moreover, rather than separate databases, server 130 may include only one database that includes the data of databases 234, 236, and 238. Memory 233, in conjunction with processor 231, may also be capable of accessing, creating and/or otherwise managing data remotely through network 150.

Methods, systems, and articles of manufacture consistent with disclosed embodiments are not limited to separate programs or computers configured to perform dedicated tasks. For example, memory 233 may be configured with a skimmer detection program 232 that performs several processes when executed by processor 231. For example, memory 233 may include a single program 232 that performs the functions of the skimmer detection system, or program 232 could comprise multiple programs. Moreover, processor 231 may execute one or more programs located remotely from server 130. For example, sever 130 may access one or more remote programs that, when executed, perform functions related to disclosed embodiments.

Memory 233 may also be configured with an operating system (not shown) that performs several functions well known in the art when executed by server 130. By way of example, the operating system may be Microsoft Windows, UNIX, Linux, Apple Computer operating systems, or some other operating system. The choice of operating system, and even the use of an operating system, is not critical to any embodiment.

Skimmer detection server 130 may include one or more I/O devices (not shown) that allow data to be received and/or transmitted by skimmer detection server 130. I/O devices may also include one or more digital and/or analog communication input/output devices that allow skimmer detection server 130 to communicate with other machines and devices, such as terminals 140-*a* to 140-*n*. The configuration and number of input and/or output devices incorporated in I/O devices may vary as appropriate for certain embodiments.

Figure 3:
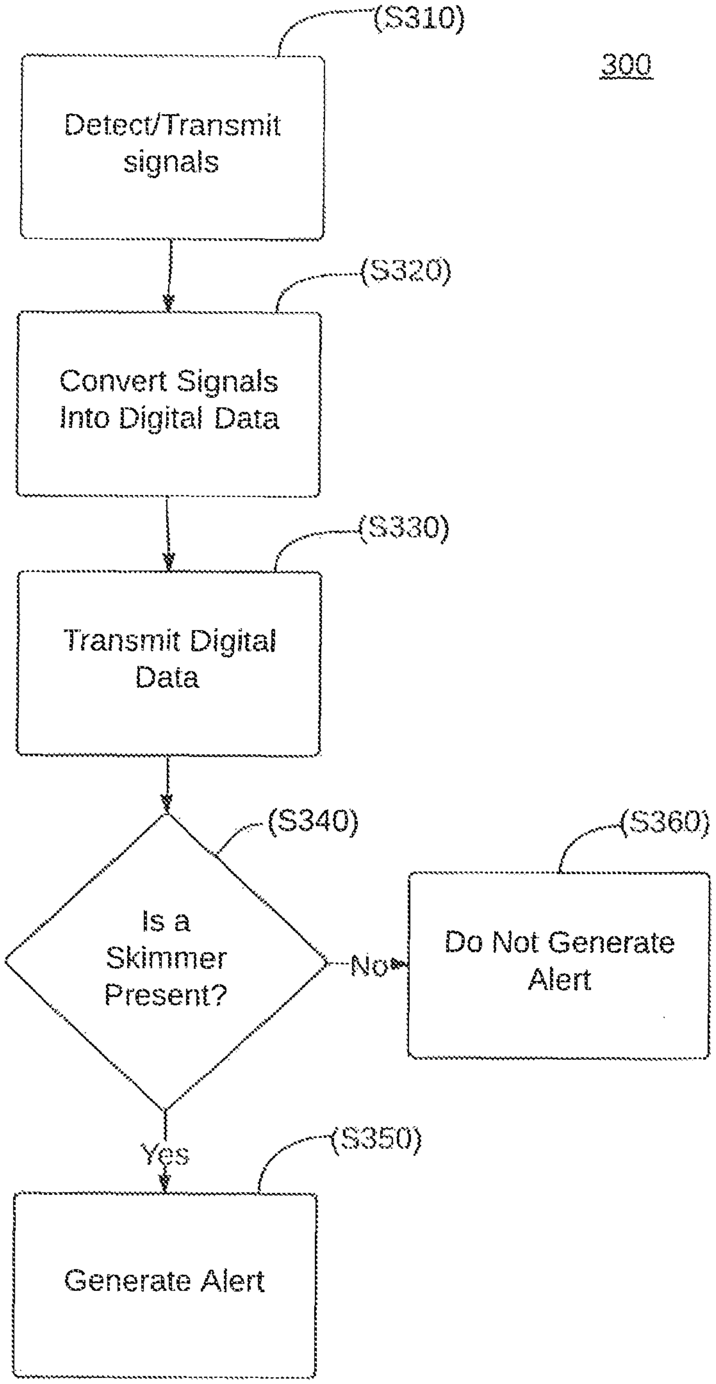
FIG. 3 is a flow chart demonstrating an exemplary process for detecting ATM skimmers consistent with disclosed embodiments.

FIG. 3 is a flow chart illustrating an exemplary skimmer detection process 300 consistent with disclosed embodiments. In certain aspects, one or more operations of the skimmer detection process 300 may be performed by skimmer detection server 130. One or more operations of process 300 may be performed by other components of system 100, such as receiver 120, etc. In one embodiment, skimmer detection server 130 may execute software instructions to perform operations of process 300 to detect one or more skimmer devices that may be present on one or more ATMs. In one example, antenna 110 may detect one or more RF signals 115 emitted by one or more electronic devices and transmit those signals to receiver 120 (S310). The detected RF signals may be signals incidentally generated by the ATM, by non-threatening electronic devices near the ATM (such as customer's cellphones), and/or by skimmers. Receiver 120 may receive the detected RF signals and convert those analog RF signals into digital data capable of being processed by skimmer detection server (S320) using any known method for converting analog data within an SDR into a format usable by a demodulation component. For example, the data may be converted and output as I/Q data using SDR hardware. Receiver 120 may then transmit the digital data to skimmer detection server 130 (S330). Receiver 120 may also transmit additional data to skimmer detection server 130. For example, receiver 120 may access ATM identification information from one or more internal or external memories and transmit the identification information to server 130 via any known transmission method such as, for example, via one or more data packets. The additional data may be sent separately from, or in combination with, the digital data. For example, data packets containing the digital data and data packets containing the identification information may be combined by a packet combiner and transmitted to skimmer detection server 130.

Skimmer detection server 130 may receive and store the digital data in one or more memories, such as in detected signals database 238 of memory 233. Skimmer detection server 130 may execute software instructions that perform operations to determine whether or not a skimmer is present on the ATM (S340). In one aspect, skimmer detection server 130 may demodulate the digital data and analyze it in accordance with software instructions to determine whether a skimmer is present. In one embodiment, for example, skimmer detection server 130 may differentiate between RF signals generated by the ATM and/or other non-harmful devices and those generated by a skimmer. This analysis is described in further detail with respect to FIG. 4. If skimmer detection server 130 determines that a skimmer is present, server 130 may generate an alert (S350). In one embodiment, skimmer detection server 130 may be configured to generate and provide an alert to one or more terminals 140-*a* to 140-*n*. In certain aspects, server 130 may be configured to generate an alert to include information associated with characteristics of the skimmer, the identity of the ATM where the skimmer was detected, etc. In certain aspects, receiver 120 may provide identification information associated with the ATM that provided signals 115 detected by antenna 110.

In one embodiment, sender 130 may be configured to determine the type of detected skimmer. For example, server 130 may perform operations that determine whether the detected skimmer has one or more characteristics that match those of a known type of skimmer through analysis of information stored in known skimmer database 234. In such instances, server 130 may generate an alert such that it includes skimmer related information obtained, for example, from known skimmer database 234. For example, if server 130 has identified the detected skimmer, server 130 may query known skimmer database 234 to match the detected skimmer to database entries of known skimmers in the known skimmer database 234. If server 130 determines a match between the detected skimmer and a database entry, server 130 may populate an alert template with information contained in the matching database entry and/or with information linked to the matching database entry. For example, in some embodiments, server 130 may generate the alert such that it may include one or more images (e.g., digital picture, or the like) of the detected skimmer, information about how to remove, disable, etc. the skimmer, and the like. In certain embodiments, if server 130 has determined the detected skimmer is an unknown skimmer, server 130 may generate information in the alert that provides directions on how a user may populate unknown skimmer database 236 with information related to the unknown skimmer (e.g., how to input information related to detected RF signals emitted by the particular skimmer device, how to create and/or upload one or more images of the particular skimmer device, how the user disabled the particular skimmer device, and the like.

In certain aspects, if skimmer detection server 130 determines that a skimmer is not present (step S340; No), server 130 may not generate an alert (S360).

The disclosed embodiments may implement process 300 such that the disclosed embodiments may monitor a plurality of ATMs to determine whether one or more skimming devices are present on the ATMs. In certain aspects, the disclosed embodiments may be configured to generate and store data related to multiple skimming devices detected at respective ATMs, at a central location, such as server 130. For example, system 100 may be configured to use data gathered from a plurality of ATMs to identify skimmers (e.g., new, known, etc.) and store that data for use by skimmer detection server 130 or by another computing component that may be in communication with skimmer detection server 130.

Figure 4:
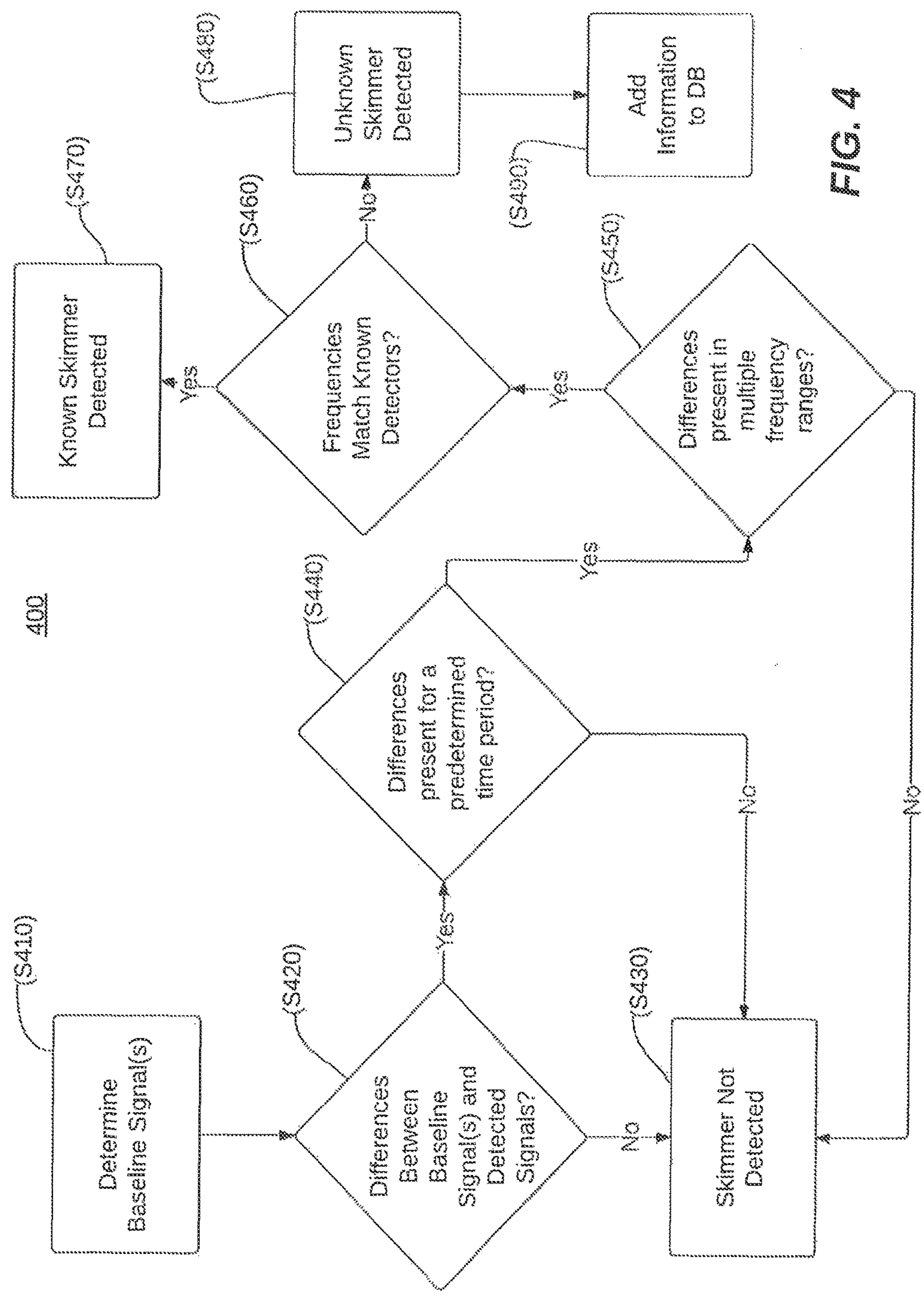
FIG. 4 is a flow chart demonstrating an exemplary RF signal analysis process consistent with disclosed embodiments.

FIG. 4 is a flow chart demonstrating an exemplary RF signal analysis process 400 consistent with disclosed embodiments. In one embodiment, server 130 may be configured to execute one or more operations of process 400 to analyze differences between baseline RF signals and detected RF signals. In certain aspects, process 400 may relate to the processes associated with operation S340 of FIG. 3. In certain embodiments, server 130 may execute one or more algorithms to determine one or more baseline signals over a range of frequencies associated with the ATM (S410). For example, server 130 may execute algorithms that may establish baselines with confidence intervals for normal non-malicious background activity. New signals may be compared against that baseline and any incremental signal that is statistically different from random Gaussian (RF static) noise maybe flagged for additional analysis. Over time, false alarms may be cataloged for future identification and to minimize alerts for non-malicious future RF emission sources. Server 130 may also provide instructions to receiver 120 to collect RF signals 115 from an area in proximity to an ATM through antenna 110 during a predetermined period of time when there is no interference from electronic devices, such as when the ATM is first installed. In some embodiments, server 130 may receive the predetermined time period from another component, it may be provided via a user using an input device, and/or it may be pre-stored in memory 233, which is accessible by processor 231. In response, receiver 120 may collect these non-interference signals (e.g., baseline signals) and provide them to server 130. Server 130 may store that information in one or more local or remote databases, such as, for example, databases located in memory 233. As another example, server 130 may be programmed with information related to the baseline signals (e.g., the RF signals emitted by a particular type of ATM) for a plurality of ATMs such that information related to the baseline signals are stored in memory (e.g., in a database in memory 233) before server 130 provides instructions to receiver 120 to collect RF signals from antenna 110. In some embodiments, server 130 may receive the information related to the baseline signals from another component, or it may be set, for example, by a device or component manufacturer, by a wireless network operator, or by a user of server 130 and/or terminal 140 using an input device. In certain embodiments, server 130 may determine the particular type of ATM being monitored based on the identification information transmitted by receiver 120 to server 130. Server 130 may also compare the type of ATM being monitored to one or more entries within the database to identify one or more database entries that match the type of ATM being monitored and may use the matching database entries to determine the baseline signals being used by the particular ATM.

Server 130 may determine whether there are any differences between the baseline signals and one or more signal(s) detected by antenna 110 and provided by receiver 120, such as the signals collected during operations S310-S330. For example, server 130 may employ a spectrum analyzer that generates signal amplitudes over various frequencies based on the detected signals. In another embodiment, server 130 may execute software instructions that perform spectrum analyzer operations to generate signal amplitudes over various frequencies based on the detected signals. Server 130 may be configured to determine whether a skimmer device is present when one or more signals exceed a threshold amplitude level. In certain aspects, server 130 may be programmed with one or more amplitude threshold levels that may be associated with anomalous operations of an ATM. The threshold level of server 130 may be set, for example, by a device or component manufacturer, by a wireless network operator, by a user of server 130, and/or by a user of terminal 140. For instance, the threshold level may be set at an amplitude level determined to be appropriate to initiate investigation as to whether the ATM may include a skimmer device such as, for example, an amplitude level 5% greater than the amplitude level of the baseline signal(s).

Server 130 may be configured to determine, when analyzing the detected RF signals provided by receiver 120, whether the amplitude of the detected RF signals exceeds the threshold level. If so, server 130 may be configured to set a threshold timer to begin measuring the duration of the detected RF signal(s) which exceed the threshold level. When the detected RF signal(s) no longer exceed the threshold level, server 130 may instruct the threshold timer to stop measuring the duration of the detected RF signals(s) and to store information relation to the measurement of the duration (e.g., length of duration, time period(s) of duration, etc.) in memory 233. Server 130 may also perform a comparison process that determines whether a difference exists between one or more baseline signals previously collected for the ATM and/or stored in memory and the detected signals associated with the ATM. For example, server 130 may compare one or more baseline signals associated with the ATM to one or more detected signals associated with the ATM to determine whether one or more differences exists in one or more frequency ranges of the compared signals. As another example, server 130 may compare the amplitude(s) of the one or more baseline signals associated with the ATM to the amplitude(s) of the detected signals associated with the ATM to determine whether one or more differences exist in the amplitudes of the compared signals. This comparison may utilize one or more types of displays. For example, RF signals may be visualized and analyzed in various frameworks. The signals may exhibit changes in the time and frequency domains. A common "oscilloscope style" display may show near real-time changes in the amplitude at various frequencies. A "waterfall" display may show similar information but with an added time dimension by showing changing amplitudes as varying colors on a graphical format that has the appearance of a waterfall If there are one or more differences between the amplitudes and/or frequencies baseline signals and the amplitudes and/or frequencies of the detected signals, server 130 may determine whether the differences are present for a predetermined time period (S440). For example, server 130 may compare the duration of the detected RF signals measured by the threshold timer to the predetermined time period. In one embodiment, the predetermined time period may be a length of time greater than an average time for a customer to initiate and complete a typical ATM transaction. In one aspect, server 130 may receive the predetermined time period from another component, or it may be provided via a user using an input device to program and/or store the predetermined time period data in memory, which is accessible by processor 231 (for example) for subsequent analysis in accordance with these embodiments. In one aspect, the software instructions executed by server 130 may include processes that take into account that skimmers are generally present on an ATM until retrieved by a person who implemented the skimmer on the ATM (e.g., a thief). Thus, in one example, server 130 may perform processes that determine whether the unidentified RF signals associated with the ATM are emitted for a period of time that is longer than the typical time for typical ATM transactions. For instance, one of ordinary skill in the art would appreciate that skimmers may emit RF signals for a period of time that would be longer, and in some instances significantly longer, than the time it would take a customer to initiate and complete an ATM transaction. Server 130 may be configured to account for changes in RF signals based on normal activities by or near a monitored ATM. For example, server 130 may be configured to determine whether detected different RF signals are not constant or near constant for the predetermined time period, and if so, may determine that the signals likely have been generated by non-harmful electronic devices passing by the proximity of the ATM, such as a customer's cellular phone. Thus in certain embodiments, if server 130 determines that the differences in detected RF signals are not present for a predetermined time period (e.g., step S440; No), server 130 may determine that a skimmer is not in place at the ATM (e.g., step S430). In one embodiment, process 400 may then restart the analysis for detecting a skimmer using additional and/or new detected signal information.

However, if server 130 determines that the different RF signals associated with the ATM are constant, or near constant, for the predetermined period of time, server 130 may determine that the signals were likely generated by a skimmer (e.g., step S440; Yes). Server 130 may also be configured to determine whether differences between the amplitude levels and/or the frequencies of the baseline signals and the detected signals are present in multiple frequency ranges during the predetermined time period (e.g., step S450). In one aspect, server 130 may be configured to execute software instructions to perform processes that take into account that skimmers generally emit RF signals in multiple frequency ranges and thus determine that that it is likely that a skimmer is present at the ATM if multiple frequencies are detected during the predetermined time period.

If server 130 determines that the differences between the amplitude levels and/or the frequencies of the baseline signals and the detected signals are present in multiple frequency ranges (e.g., step S450; Yes), server 130 may determine whether the frequency emissions match any known skimmer frequencies (step S460). For example, server 130 may be configured to perform one or more processes that request or obtain skimmer frequency data from one or more databases, such as known skimmer database 234, and compare the detected frequency or combination of frequencies associated with the detected RF signals with the frequency or combination of frequencies of known skimmers stored in known skimmer database 234. If the comparison results in a match (e.g., one or more frequencies of the detected RF signals match one or more frequencies of known skimmers), server 130 may determine that the detected RF signals are generated by a known skimmer associated with the known skimmer data (e.g., step S470). However, if server 130's comparison fails to result in a match, server 130 may determine that the detected frequencies are being generated by an unknown skimmer (e.g., step S480). In one embodiment, server 130 may store the detected frequencies of the RF signals and information related to the detection (e.g., location information, time information, etc.) in unknown skimmer database 236 (e.g., step S490). The disclosed embodiments may later use the updated unknown skimmer frequency data to identify and detect an unknown skimmer based on other detected SF signals for the ATM or another ATM. Moreover, the disclosed embodiments may provide the unknown skimmer frequency data to another component for additional analysis to identify the unknown skimmer based on other characteristics of the detected SF signals.

The disclosed embodiments may include methods, systems, and computer-readable storage media that provide skimmer detection processes for detecting skimmer(s) located on or near ATMs using incidental RF signal emissions. For purposes of explanation only, certain aspects and embodiments are described herein with reference to the components illustrated in FIGS. 1-4. The functionality of the illustrated components may overlap, however, and may be present in a fewer or greater number of elements and components. Further, all or part of the functionality of the illustrated elements may co-exist or be distributed among several geographically dispersed locations. Moreover, the disclosed embodiments may be implemented in various environments and are not limited to the illustrated embodiments.

Further, the sequences of operations described in connection with FIGS. 3-4 are exemplary and not intended to be limiting. Additional or fewer operations or combinations of operations may be used or may vary without departing from the scope of the disclosed embodiments. For example, server 130 of system 100 may determine that a skimmer is present at an ATM using one or more of operations S440, S450, and/or S460 of FIG. 4. Furthermore, the disclosed embodiments need not perform the sequence of operations in any particular order, including those shown in FIGS. 3 and 4, and other operations may be used without departing from the scope of the disclosed embodiments. Also, the processes described herein are not inherently related to any particular system or apparatus and may be implemented by any suitable combination of components.

Other aspects of the disclosed embodiments will be apparent to those skilled in the art from consideration of the specification and practice of the disclosed embodiments. It is intended that the specification and examples be considered as exemplary only, with exemplary scopes of the disclosed embodiments being indicated by the following claims.

What is claimed is:

1. A system for detecting ATM skimmers comprising:
an antenna located within communication range of an ATM, configured to:
detect one or more radio frequency (RF) signals, the RF signals comprising at least one or more signals emitted by the ATM, and
transmit the RF signals to a receiver; and
a receiver, comprising:
a memory storing instructions; and
one or more processors that execute the instructions to perform one or more operations for detecting ATM skimmers, the operations including:
receiving RF signal data corresponding to the one or more detected RF signals,
determining one or more unidentified RF signals of the detected ATM RF signals that differ from one or more baseline RF signals,
determining whether the one or more unidentified RF signals are present for a predetermined period of time, and
determining whether a skimmer is present at the ATM based on a determination that the one or more unidentified RF signals are present for the predetermined period of time and based on a determination that the one or more unidentified RF signals match one or more RF signals of a known skimmer.

2. The system of claim 1, the operations further including:
determining whether the skimmer is present at the ATM based on whether an amplitude of the detected RF signals exceeds a threshold level.

3. The system of claim 1, the operations further including:
storing the unidentified RF signals in a memory if it is determined that the one or more unidentified RF signals do not match the one or more RF signals of the known skimmer.

4. The system of claim 3, the operations further including:
determining whether the skimmer is present at the ATM based on a determination that the one or more unidentified RF signals match one or more RF signals of an unknown skimmer.

5. The system of claim 1, the operations further including:
generating an alert if it is determined that the skimmer is present at the ATM, wherein the alert comprises a location of the ATM.

6. The system of claim 5, wherein:
if it is determined that the one or more unidentified RF signals match the one or more RF signals of the known skimmer, the alert further comprises at least one of a name of the known skimmer, an image of the known skimmer, and information about how to disable the known skimmer; and
if it is determined that the one or more unidentified RF signals do not match the one or more RF signals of the known skimmer, the alert further includes instructions for obtaining information related to the skimmer.

7. The system of claim 1, the operations further including:
determining one or more frequencies associated with the one or more unidentified RF signals;
determining one or more frequencies associated with the one or more baseline RF signals;
determining one or more differences between the one or more frequencies associated with the one or more unidentified RF signals and the one or more frequencies associated with the one or more baseline RF signals; and
determining whether the skimmer is present at the ATM based on a determination that there are a plurality of differences between the one or more frequencies associated with the one or more unidentified RF signals and the one or more frequencies associated with the one or more baseline RF signals.

8. The system of claim 1, the operations further including:
determining one or more amplitudes associated with the one or more unidentified RF signals;
determining one or more amplitudes associated with the one or more baseline RF signals;
determining one or more differences between the one or more amplitudes associated with the one or more unidentified RF signals and the one or more amplitudes associated with the one or more baseline RF signals; and
determining whether the skimmer is present at the ATM based on a determination that there are a plurality of differences between the one or more amplitudes associated with the one or more unidentified RF signals and the one or more amplitudes associated with the one or more baseline RF signals.

9. A computer-implemented method for detecting ATM skimmers comprising:

detecting, by an antenna located within communication range of an ATM, one or more radio frequency (RF) signals, the RF signals comprising at least one or more signals emitted by the ATM;

receiving, by a computing device from the antenna, radio frequency (RF) signal data corresponding to the one or more detected RF signals;

determining, by the computing device, one or more unidentified RF signals of the detected ATM RF signals that differ from one or more baseline RF signals;

determining, by the computing device, whether the one or more unidentified RF signals are present for a predetermined period of time; and determining, by the computing device, whether a skimmer is present at the ATM based on a determination that the one or more unidentified RF signals are present for the predetermined period of time and that that the one or more unidentified RF signals match one or more RF signals of a known skimmer.

10. The method of claim 9, further comprising:

determining, by the computing device, whether the skimmer is present at the ATM based on whether an amplitude of the detected RF signals exceeds a threshold level.

11. The method of claim 9, further comprising:

storing, by the computing device, the unidentified RF signals in a memory if it is determined that the one or more unidentified RF signals do not match the one or more RF signals of the known skimmer.

12. The method of claim 11, further comprising:

determining, by the computing device, whether the skimmer is present at the ATM based on a determination that the one or more unidentified RF signals match one or more RF signals of an unknown skimmer.

13. The method of claim 9, further comprising:

generating, by the computing device, an alert if it is determined that the skimmer is present at the ATM, wherein the alert comprises a location of the ATM.

14. The method of claim 13, further comprising:

determining, by the computing device, that the one or more unidentified RF signals match the one or more RF signals of the known skimmer; and generating the alert such that the alert includes at least one of a name of the known skimmer, an image of the known skimmer, and information about how to disable the known skimmer.

15. The method of claim 13, further comprising:

determining, by the computing device, that the one or more unidentified RF signals do not match the one or more RF signals of the known skimmer; and generating the alert such that the alert includes information for presenting to a user for obtaining information related to the skimmer.

16. The method of claim 9, further comprising:

determining, by the computing device, one or more frequencies associated with the one or more unidentified RF signals;

determining, by the computing device, one or more frequencies associated with the one or more baseline RF signals;

determining, by the computing device, one or more differences between the one or more frequencies associated with the one or more unidentified RF signals and the one or more frequencies associated with the one or more baseline RF signals; and determining, by the computing device, whether the skimmer is present at the ATM based on a determination that there are a plurality of differences between the one or more frequencies associated with the one or more unidentified RF signals and the one or more frequencies associated with the one or more baseline RF signals.

17. The method of claim 9, further comprising:

determining, by the computing device, one or more amplitudes associated with the one or more unidentified RF signals;

determining, by the computing device, one or more amplitudes associated with the one or more baseline RF signals;

determining, by the computing device, one or more differences between the one or more amplitudes associated with the one or more unidentified RF signals and the one or more amplitudes associated with the one or more baseline RF signals; and determining, by the computing device, whether the skimmer is present at the ATM based on a determination that there are a plurality of differences between the one or more amplitudes associated with the one or more unidentified RF signals and the one or more amplitudes associated with the one or more baseline RF signals.

18. A non-transitory computer-readable storage medium encoded with instructions which, when executed by a processor, perform a process for detecting ATM skimmers, the process comprising:

receiving, from an antenna located within communication range of an ATM configured to detect one or more radio frequency (RF) signals comprising at least one or more signals emitted by the ATM, radio frequency (RF) signal data corresponding to the one or more detected RF signals;

determining one or more unidentified RF signals of the detected ATM RF signals that differ from one or more baseline RF signals;

determining whether the one or more unidentified RF signals are present for a predetermined period of time; and determining whether a skimmer is present at the ATM based on a determination that the one or more unidentified RF signals are present for the predetermined period of time.

19. The system of claim 1, wherein information concerning the known skimmer is stored in a database, the information comprising at least one from the group comprising of:

a name of the known skimmer, an image of the known skimmer, a frequency of an RF signal of the known skimmer, and an amplitude of an RF signal of the known skimmer.

20. The method of claim 9, wherein information concerning the known skimmer is stored in a database, the information comprising at least one from the group comprising of:

a name of the known skimmer, an image of the known skimmer, a frequency of an RF signal of the known skimmer, and an amplitude of an RF signal of the known skimmer.

* * * * *